Dec. 10, 1957  J. S. STUBBE  2,815,974
ENGINE-GENERATOR COUPLING
Filed April 29, 1955
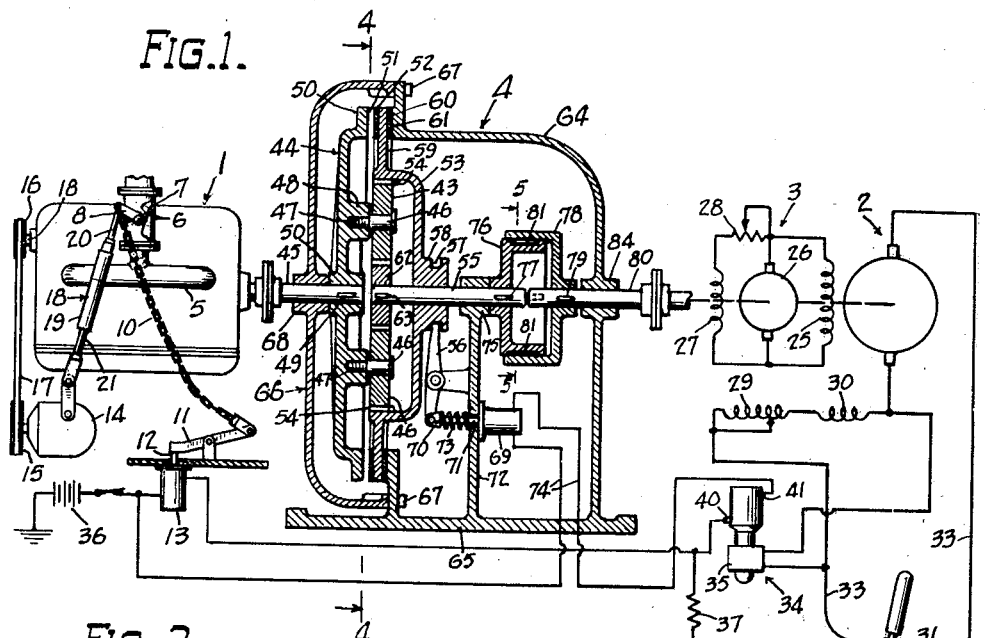
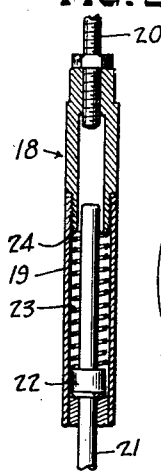
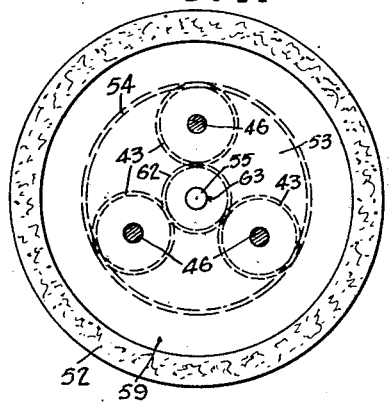
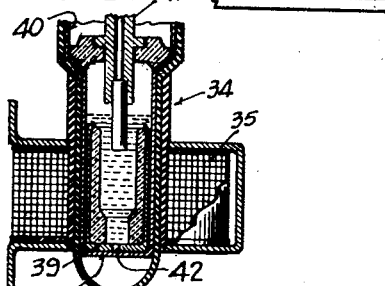
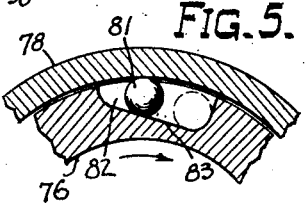
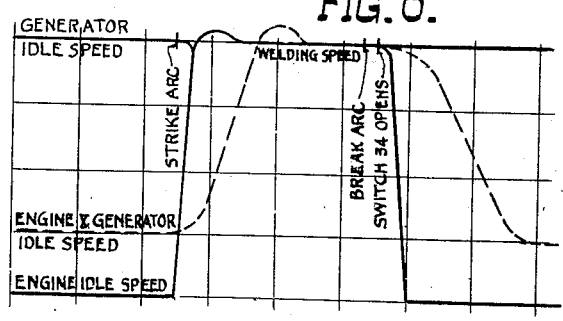
INVENTOR.
James S. Stubbe
BY
ATTORNEYS.

2,815,974
Patented Dec. 10, 1957

2,815,974
ENGINE-GENERATOR COUPLING

James S. Stubbe, Milwaukee, Wis., assignor to A. O. Smith Corporation, Milwaukee, Wis., a corporation of New York Application April 29, 1955, Serial No. 504,799

11 Claims. (Cl. 290—40)

This invention relates to a coupling of a generator and a prime mover.

In a prime mover-generator unit it is desirable to have the prime mover operate at a reduced speed when the generator is unloaded. A reduced speed of the prime mover results in an economy of operation as well as a reduction in wear of the prime mover. An example of this type of unit is the conventional internal-combustion engine-arc welding generator unit.

However, when the engine, for example, is allowed to idle between welding periods, the generator speed is correspondingly reduced. Consequently, the generator output is reduced and when welding is to be restarted, the generator must first be brought up to normal speed. If the generator speed is not increased sufficiently before starting to weld, the generator overloads the engine.

To avoid the engine overloading, the engine is generally brought up to speed prior to placing the load across the generator. The engine speed is increased by manually opening the engine throttle or by momentarily applying the load and having load responsive mechanism open the throttle. The engine comes up to speed and is driving the generator at a sufficient speed to produce the required power demands. The load is then applied to generator.

In an arc welding engine-generator unit, a load responsive electromagnet, or similar device, opens the throttle in response to contact between the electrode and the work. The welder, immediately prior to the welding operation, touches the work and then breaks the arc. After the engine and generator are up to operating speed, the welding operation is begun.

According to the present invention, a planetary gearing and an overriding clutch couples the generator to the engine. When the welding operation is discontinued, the engine drives the generator through an overdrive gearing. In this manner, the generator is maintained at operating speed. When the operator starts to weld, the overdrive gearing is disengaged and the free-wheeling or overriding clutch allows the engine to rapidly come up to generator speed. The free-wheeling or overriding clutch unit prevents the more rapidly rotating generator from driving the engine. When the engine and the generator are at the same speed the engine drives the generator through a direct drive. If necessary, the generator which decreases slightly in speed is then raised to normal welding speed.

The drawing furnished herewith illustrates the best mode presently contemplated for carrying out the invention.

In the drawing:

Figure 1 is a diagrammatical view, with parts in section, of an engine-generator unit employing the coupling mechanism of the present invention;

Fig. 2 is a vertical section view of a governor link shown in Figure 1;

Fig. 3 is an enlarged fragmentary vertical section of a time-delay switch shown in full in Figure 1;

Fig. 4 is a view taken on line 4—4 of Figure 1;

Fig. 5 is an enlarged fragmentary view taken on line 5—5 of Figure 1; and

Fig. 6 is a graphical representation comparing the speed versus time curves for a unit employing the present invention and a conventional unit.

Referring to Figure 1, an internal-combustion engine 1 is coupled, as the driver, to a welding generator 2 and an exciter generator 3. A coupler 4 consisting of a planetary gearing system, and a free-wheeling or overriding clutch unit operably connects the engine to the generators.

In an arc welding unit, the internal-combustion engine 1 is normally a gasoline engine. The gasoline engine shown for purposes of illustration is similar to that shown in Patent No. 2,396,176 to E. H. Hobart.

As in all gasoline engines, there is an intake manifold 5 upon which a carburetor 6 is mounted. The carburetor 6 has a butterfly valve 7 which regulates the air-gas mixture to the engine and consequently the speed of the engine. The butterfly valve is more commonly known as the throttle valve.

To actuate the valve 7, one end of lever arm 8 is attached to the valve shaft 9. The lever arm 8 is connected for pivotal movement, by a chain 10 and crank 11, to the armature 12 of a solenoid 13. The position of the valve 7 is, in part, dependent upon the energization of the solenoid 13 which responds to the output of the welding generator 2, as subsequently described.

A speed governor 14 is connected, as by a pair of pulleys 15 and 16 and a drive belt 17, to an auxiliary output shaft 18 of the engine 1. The speed governor 14 is of any well-known variety.

The speed governor 14 is connected to the butterfly valve 7 through a spring-loaded link 18. During the welding operation, the governor 14 controls the throttle to maintain a constant generating speed.

As more fully described in the referred-to patent, the spring-loaded link 18 permits the solenoid 13 to control the throttle when starting and stopping the welding operation. Referring to Figs. 1 and 2, the link 18 consists of a cylindrical casing 19 with a throttle-connected shaft 20, which is attached to lever arm 8, threaded into one end and a governor-connected shaft 21 slidably journaled in the opposite end. The governor-connected shaft 21 is provided with a collar 22 somewhat removed from its free end. The collar acts as the seat for a spring 23 which coacts with a ledge 24 in the casing and biases the casing upwardly toward the lever arm 8.

Therefore, the throttle movement resulting from energization of solenoid 13 is taken up by the spring and the governor setting is unaffected. Likewise, when the solenoid is energized to control the throttle, any governor movement is also taken up by the spring.

The engine speed is varied to correspond to the loading and unloading of the generator 2, as more fully described hereinafter.

The welding generator 2 has a field winding 25 connected in series with the armature 26 of the exciter generator 3. Consequently, the operation of the generator 3 by the engine 1 provides a field current for the welding generator 2. The current from the main or welding generator 2 is then available for welding.

The exciter generator 3 is provided with a self-excited field 27 and an adjustable resistance 28 in series with its own armature. This is, in general, the conventional construction for an exciter.

In addition to the field winding 25, the generator 2 comprises an adjustable series field 29 and a commutating field 30 connected in series with its armature.

The output of generator 2 is placed across the electrode 31 and work 32 as by leads 33 and a welding arc is struck therebetween.

An electromagnetic switch 34 is constructed with a winding 35 connected across the series field and the commutating fields 29 and 30, respectively, to make it load responsive. The switch 34 is closed when energized and is connected in shunt with the solenoid 13 to provide a current bypass from a battery 36 or other power source, to ground through a resistor 37 during the welding operation. When the switch is de-energized, it it open and the solenoid 13, which is also connected between the battery and ground, is energized. Consequently, the energized solenoid 13 maintains the throttle valve 7 in a closed or idle position when the welding operation is stopped.

As more clearly shown in Fig. 3, the electromagnetic switch 34 is also a time-delay switch such that a predetermined time lapses before it opens. The solenoid 13 does not, therefore, move the throttle to idle position immediately upon a cessation of welding. The time delay is desirable to allow for changing electrodes and also other relatively momentary welding stoppages. The illustrated switch 34, as in the previously cited patent, is provided with a mercury well 38 having a movable plunger 39 disposed therein. The plunger 39 normally floats within the mercury and in that position the electrical connection between the switch contacts 40 and 41 is broken. The winding, when energized, pulls the plunger 39 into the mercury well 38 displacing the mercury which then completes the connection between the switch contacts. The plunger 39 is generally cup-shaped with a small aperture 42 in the bottom thereof. Therefore, when the plunger 39 is pulled down by energization of winding, it fills with mercury which can thereafter only escape through the aperture 42. Consequently, when the winding is de-energized, the mercury slowly passes through the aperture 42 of the plunger 39 which then again floats in the mercury and breaks contact between the switch contacts.

As previously noted, the switch 35 which is illustrated is more fully disclosed in the cited Patent No. 2,396,176.

According to the present invention, when the engine 1 is idling, it is connected to the generators 2 and 3 with the planetary gearing in a stepped-up ratio as now described.

The planetary gearing comprises three planetary gears or pinions 43 interconnected by a yoke 44 which is keyed to the engine shaft 45.

The planetary gearing provides either a direct one-to-one driving ratio or a stepped-up or overdriving ratio whereby the generator 2 can operate at rated speed while the engine 1 is idling.

As more clearly seen in Fig. 4, the planetary gears 43 are circumferentially spaced, at equal angular intervals, about the shaft 45. Each planetary gear 43 is mounted on a bearing 46 which is secured to the yoke 44 as by bolts 47. The bolts 47 are each threadedly received in a shoulder 48 formed on the yoke.

The yoke 44 is secured to the engine shaft as by a key 49 and is provided with an axially offset flange 50 on its outer periphery. The flange 50 provides a clutch surface or face 51 which cooperates with a clutch plate 52 to lock the planetary gears 43 to a ring gear 53.

The ring gear 53 is generally cup-shaped and is provided with gear teeth 54 on its inner peripheral surface which mesh with the planetary gears 43. The ring gear 53 is journaled for free rotation about a horizontal shaft 55 and is axiially movable to a first and a second position by a bellcrank 56. The bellcrank 56 mates with an annular groove 57 formed in a hub 58 of the gear 53. In the first named position, the clutch plate 52, carried by a flange 59 extending radially from gear 53, engages the yoke clutch face 51 and frictionally binds the planetary gears 43 and the ring gear 53 together.

In the second named position of the ring gear, the clutch plate 52 and face 51 are disengaged and a clutch plate 60, carried on the opposed side of flange 59, engages a stationary clutch surface 61 to hold the ring gear 53 against rotation.

When the ring gear 53 is in the first position, that is, bound to the yoke 44, the ring gear and the planetary gears rotate as a single unit; driving a sun gear 62, which is keyed to shaft 55 by key 63, through a direct drive. On the other hand, when the ring gear 53 is in the second position and stationary, as described, the planetary gears 43 are driven directly by the engine shaft and also roll on the stationary ring gear 53. The sun gear 62 is consequently driven at an increased speed.

The stationary clutch surface 61 is formed on a raised shoulder of the gear wall or casing 64 which extends upwardly and partially over the gearing from a base 65. A gear cover 66 is bolted as by bolts 67 to the casing 64 to enclose the gears.

The engine shaft 45 is journaled in a bearing 68 formed centrally of the cover 66.

The movement of the ring gear 53 to the first and subsequently the second positions described is effected by a load responsive solenoid 69 which has the one end of the bellcrank 56 secured, as by a lug 70, to its armature 71. The solenoid 69 is attached as by brazing to a bearing support 72 extending from the base 65. A spring 73 is placed about the armature 71 between the lug 70 and support 72 and tends to pivot the bellcrank 56 outwardly and urge the ring gear 53 to the second or stationary position.

The bellcrank 56 is centrally pivoted and has its opposite end meshing with the annular groove 57 in the ring gear hub 58, as previously described. The pivotal movement of the bellcrank 56 moves the ring gear 53 axially and thereby controls the clutching of the ring gear 53 to the planetary gears 43 and the casing 64.

As previously noted, the engine 1 is to drive the welding generator 2 and the exciter 3 through a one-to-one or some other direct drive ratio only while welding. Between welding periods, the overdrive maintains the generator at full speed and allows the engine to run at idle speed.

To make the clutching, described previously, load responsive, the solenoid 69 is connected by conductors 74 to the battery 36 in series with switch 34.

When not welding, the solenoid is de-energized and the spring 73 biases the bellcrank to hold the planetary gearing in the overdrive position. When welding, the solenoid is energized and rotates the bellcrank, against the bias of the spring, to move the planetary gearing to the direct drive position and consequently the shaft 55 is driven directly. A bearing 75, of bearing support 72, supports the shaft 55 to which the sun gear 62 is keyed.

A cup-shaped pinion cage 76 of the free-wheeling unit is also keyed to the output shaft 55 as by key 77. The pinion cage 76 opens toward the welding generator 2 and is slipped into a reversed cup-shaped free wheel cam 78. The cam 78 is keyed, as by key 79, to the generator shaft 80 and through free-wheeler rollers 81 is connected in driving engagement to the cage 76.

As more clearly shown in Fig. 5, the pinion cage 76 is provided with a plurality of circumferentially spaced, peripheral recesses 82 which receive the free-wheel rollers 81. The recesses 82 have an axially tapered base 83, with the recess increasing in depth in the direction of cage rotation.

The free-wheel cam 78 slipped over the pinion cage forms a plurality of circumferentially extending chambers by closing the top of recesses 82 each of which receives a free-wheel roller 81.

The free-wheel rollers are cylindrical in shape and have a diameter greater than the smallest depth and less than the greatest depth of the closed recesses 82. Therefore, as the roller moves toward the smaller end of the recesses 82, it is wedged between the cage 76 and cam 78 and locks them together. However, if the roller moves toward the larger end of the recesses 82, as shown in dotted outline in Fig. 5, it rolls free and the cage 76 and cam 78 are not locked together. For purposes of illustration, the wedging is shown in Fig. 5 as occurring at the center of the chamber.

Therefore, when the pinion cage 76 is being driven by engine 1 through the planetary system at a speed tending to be greater than the rotation of the free-wheel cam 78, the cam 78 acts as a drag and the roller is wedged between the cage and the cam locking them together. The engine 1 will then drive the welding generator 2.

On the other hand, if the free-wheel cam 78 is rotating faster than the cage 76, the roller is forced into the larger end of the recess 82 and the units each roll freely until the cage speed tends to be greater than the cam speed.

The generator shaft 80 is journaled in a bearing 84 in the casing 64.

The operation of the illustrated embodiment of the invention is as follows; referring to Fig. 6 which illustrates a typical speed versus time or operating curve of a unit employing the invention and a unit not employing the invention.

In Fig. 6, the solid curve is typical of a unit employing the new coupling mechanism of the present invention whereas the dashed curved is typical of a unit without the coupling.

Assume that the engine 1 is started in preparation for welding, with the work 32 and the electrode 31 connected across the generator output.

The engine 1 idles because the solenoid 13 is energized by the battery 36 and holds the throttle valve 7 in closed position.

The welding generator 2 runs at operating speed because the planetary gear system is in overdrive. This results from de-energization of the load responsive solenoid 69 and the movement of the ring gear 53 to a stationary position under the action of the spring 73 on the bell-crank 56.

With the ring gear 53 held against rotation, the planetary gears 43 are not only driven by the engine shaft, but also roll on the ring gear teeth 54. This dual movement of the planetary gears 43 results in an increased speed of the sun gear 62 which drives shaft 55 and pinion cage 76.

As the cage 76 starts to rotate, the cam 78 tends to remain stationary and in so doing tends to draw the rollers 81 into the shallow end of the roller recesses 82. This results in the wedge drive connection between the cage 76 and cam 78.

When the operator strikes an arc and begins a welding operation, the solenoid 69 and electromagnetic switch winding 35 are simultaneously energized.

When the winding 35 of switch 34 is energized, it exerts a magnetic pull on the cup-shaped plunger 39 which drops rapidly within the mercury well 38. The level of mercury raises and completes the circuit between the switch contacts 40 and 41. This completes the shunt or by-pass circuit around the solenoid 13 which is thereupon de-energized. The throttle valve 7 is then released to full speed position by the action of the governor 14. The engine 1 which is unloaded, as hereinafter described, can rapidly come up to welding speed as seen in Fig. 6.

Energization of the solenoid 69 results in the retraction of the armature 71 against the bias of spring 73. The bell-crank 56 is pivoted, counterclockwise in the drawing, and moves the ring gear 53 in a locked engagement with the planetary gears 43. Thereupon, the ring gear 53 and planetary gears 43 rotate as a single gear and drive the sun gear 62 directly.

Except for the operation of the free-wheeling unit, the driven generators 2 and 3 would attempt to rotate at the same speed as the engine 1. This would substantially reduce the generator speed and reduce the generator output. Welding cannot be done until the generator is brought back up to normal speed.

As long as the output shaft is rotating the pinion cage 76 at a speed tending to be above the speed of the generator shaft, the roller 81 locks the cage 76 and the cam 78 together in driving relation. This results from the cam drag action, previously noted, which drags the roller 81 into wedging engagement.

Now, when the generator shaft 80 is rotating faster than the output shaft 55, the cam 78 forces the roller 81 into the forward or deep end of the recesses 82 where the roller 81 is free to rotate about its own axis. Consequently, there is no locking of the cage 76 and cam 78 together.

Therefore, immediately following the change from overdrive to a direct coupling with the planetary gear mechanism, the engine is free to accelerate without any load. As a result, it will come up to speed very rapidly.

The engine runs free until its speed approaches the speed of the generator. At this speed the engine 1 tends to drive the cage 76 faster than the cam 78 and the roller 81 is wedged in position to lock the cage and cam together. The engine then drives the welding generator.

While the engine is rapidly accelerating, the generator speed decreases slightly, shown by the small dip in the generator speed curve in Fig. 6. The armature of the generator 2 preferably provides sufficient inertia to prevent any substantial decrease in generator speed. The armature, if need be, is weighted to increase its inertia.

The engine can bring the generator up to rated speed easily because of the small decrease in generator speed. As the engine is accelerating, the inertia force carries the engine and generator speed slightly above normal. This is shown by the hump in curve in Fig. 6.

In the alternative, the overdrive coupling or idle speed can be set so as to drive the generator 2 slightly above rated speed during idling so that when switching to direct drive the engine and generator speeds coincide at the welding speed. This can be accomplished with an increased gear ratio or by adjusting the idle engine speed to a somewhat higher value.

When the welding arc is broken, the time-delay switch 34 maintains the engine and generator in the normal welding relationship for a short period of time. If the arc is not re-established within the allotted time, switch 34 opens breaking the energizing circuit for solenoid 69 and completing the circuit for solenoid 13, as previously described. As a result, the throttle 7 is closed by the solenoid 13 and the engine speed is reduced to the idle speed. Because the spring 73, upon de-energization of the solenoid 69, returns the planetary gearing to an overdriving position, the generator maintains its normal speed.

The above procedure is contrasted to a unit without the coupler 4 by the dashed curve in Fig. 6. As shown, the engine and generator speed follow each other directly. Consequently, when an arc is to be struck, a relatively appreciable period of time elapses before the generator is capable of maintaining a welding arc. The coupling mechanism of the present invention also allows a greater reduction in the speed of the engine with a consequent reduction in operating costs.

Further, the new coupling mechanism in an arc welding unit provides a greater open circuit voltage during idling periods. Consequently, the initial arc is struck at a higher and more stable voltage than with conventional apparatus.

Various modes of carrying out the invention are contemplated as within the scope of the accompanying claims particularly pointing out and distinctly claiming the subject matter which is regarded as the invention.

I claim:

1. In an engine-generator unit, a coupling connecting the engine to the generator through a plurality of speed ratios, means responsive to a load on the generator to change the speed ratio of the coupling, means responsive to the load on the generator to change the engine speed to maintain the generator speed substantially constant with changes in the speed ratio of the coupling, and means to prevent the generator from driving the engine when changing from a higher to a lower speed ratio.

2. In a prime mover-generator unit, a driving coupling comprising a gear system alternately connecting the prime mover to the generator through a first gear train having a low gear ratio and a second gear train having a high gear ratio, means responsive to the loading and unloading of the generator to change the gear system connection from said first train to the second train, respectively, and to change the power supplied to the prime mover, and means for preventing the generator from driving the prime mover when the connection changes from the second to the first gear train.

3. In an engine-generator arc welder, a coupling comprising a low ratio gear train interconnecting the engine and the generator to drive the generator when arc welding, a high ratio gear train interconnecting the engine and the generator to drive the generator between periods of arc welding, electromagnetic means responsive to the power of the welding arc to maintain the engine-generator connection through the low gear ratio when welding and through the high gear ratio when not welding and to supply energy to the engine to maintain a predetermined substantially constant generator speed, and means for preventing the generator from driving the prime mover when the coupling connection is changed from the high gear train to the low gear train.

4. A coupling for connecting a main-load generator to a prime mover, comprising a planetary gear system having a first position connecting the generator to the prime mover through a direct drive gear train and having a second position connecting the generator to the prime mover through an overdrive gear train, means responsive to the loading of the generator to change from the overdrive gearing to the direct drive gearing, means responsive to the loading of the generator to control the energy supply to the engine to maintain the generator speed substantially constant, and means for preventing the generator from driving the prime mover when changing from the overdrive to the direct drive.

5. A coupling for connecting a main-load generator to an internal-combustion engine, which comprises a planetary gear system interconnecting the generator and the internal-combustion engine, said gear system alternately having a direct gear train and an epicyclic gear train connecting the engine to the generator to drive the generator at a substantially constant speed with a change in engine speed, means responsive to the load on the generator to simultaneously control the speed of the engine and the gear connection of the engine and the generator, and an overriding clutch in the connection between the gear system and the generator to prevent the generator from driving the engine.

6. A coupler for connecting a prime mover to a generator which is the principal load on the prime mover, which comprises a planetary transmission biased to an overdrive position and movable to a direct drive position, said transmission having an input gear connected to the engine and an output gear, electromagnetic means having a winding connected in circuit with the output of the generator and having an armature connected to the transmission to change said planetary transmission to the direct drive position in response to a load on the generator, time delay means to delay the return of the transmission to said overdrive position upon removal of the load from the generator, and a free-wheeling clutch connecting the output gear to the generator shaft and constructed to disengage the generator and prime mover when the generator speed is greater than the prime mover speed.

7. A coupler for connecting a prime mover to a generator which is the principal load on the prime mover, which comprises a planetary transmission having a set of planetary gears connected to the prime mover, a movable ring gear disposed in engagement with the planetary gears and having a first position wherein the ring and planetary gears are locked together to rotate as a unit and having a second position wherein the ring gear is stationary, with said planetary gears being adapted to roll thereon, means biasing the ring gear to said second position, a sun gear disposed in engagement with the planetary gears and driven thereby, electromagnetic means having a winding energized by an electrical output of the generator and having a movable armature mechanically connected to the movable ring gear, said armature moving said ring gear to said first position upon a predetermined generator output, means connecting the generator to the sun gear, and means for disengaging said last named means when the generator speed is greater than the prime mover speed.

8. In a coupling for an internal-combustion engine-generator arc welder, an overdrive transmission having an input gear connected to the output of engine and having an output gear connected to the generator, said input gear comprising a plurality of planetary gears, said transmission having an intermediate gear means adapted to be alternately moved to connect the output gear and the input gear in an overdrive position and in a direct drive position, means biasing said intermediate gear means to the overdrive position, means responsive to striking of an arc to move the intermediate gear to the direct drive position and to simultaneously accelerate the engine, and a free-wheeling clutch connecting the output gear and the generator whereby the generator is prevented from driving the engine when the engine is accelerating to the speed of the generator.

9. In a coupler for an internal-combustion engine-generator arc welding unit, a planetary gear system connected to the output of the engine and to the input of the generator, said planetary gear system having a direct drive gearing to drive the generator at a predetermined speed during an arc welding operation and having an overdrive gearing to drive the generator at the same speed during idling between arc welding operations, electromagnetic means responsive to a cessation of an arc welding operation to reduce the speed of the engine, electromagnetic means responsive to the generator output to change the planetary gear system between the direct drive gearing for arc welding and the overdrive gearing for idling, and a free-wheeling clutch connecting the planetary gear system to the generator to prevent the generator from acting as a driving unit.

10. In an arc welding internal-combustion engine-generator, a coupling which comprises a series of planetary gears connected to an engine output shaft and driven in accordance with rotation of the shaft, a sun gear connected to a generator input shaft and disposed in engagement with said planetary gear and driven thereby, a ring gear disposed in engagement with said planetary gear and being movable axially to a first and a second position, means to lock the ring gear and planetary gears together to prevent relative movement therebetween when the ring gear is in said first position and effect rotation of said ring gear in accordance with rotation of said planetary gears, means to lock the ring gear against rotation with said planetary gears when in said second position whereby the planetary gears ride thereon, a solenoid having a winding energized in response to the striking of an arc and being connected with the output of the generator and having an armature connected to the ring gear, said armature being adapted to hold the ring gear in said first position when the winding is energized, a spring biasing the armature to the second position, a free-wheeling roller cage connected to the sun gear, a plurality of free-wheeling rollers carried by said cage, an overriding cam connected to the generator and operatively associated with said cage whereby the engine is permitted to drive the generator and the generator is prevented from driving the engine, and a second solenoid responsive to the presence and the absence of the arc and having an armature connected to a speed control on the engine, said armature being adapted to move the speed control to a reduced speed position in the absence of the arc whereby the speed of the generator is maintained substantially constant.

11. An arc welding engine-generator according to claim 10 having a time delay means connected to said second solenoid whereby the speed reduction action is retarded a predetermined period after breaking of the arc.

References Cited in the file of this patent

UNITED STATES PATENTS

| 2,266,164 | Claytor | Dec. 16, 1941 |
| 2,331,684 | Henningsen | Oct. 12, 1943 |
| 2,396,176 | Hobart | Mar. 5, 1946 |

FOREIGN PATENTS

| 10,486 | Great Britain | of 1904 |
| 612,406 | France | July 31, 1926 |